(12) United States Patent
Shimizu

(10) Patent No.: US 10,718,404 B2
(45) Date of Patent: Jul. 21, 2020

(54) CORD LOCK

(71) Applicant: NIFCO INC., Yokosuka-shi, Kanagawa (JP)

(72) Inventor: Yohei Shimizu, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 16/301,947

(22) PCT Filed: May 16, 2017

(86) PCT No.: PCT/JP2017/018417
§ 371 (c)(1),
(2) Date: Nov. 15, 2018

(87) PCT Pub. No.: WO2017/199977
PCT Pub. Date: Nov. 23, 2017

(65) Prior Publication Data
US 2019/0285138 A1 Sep. 19, 2019

(30) Foreign Application Priority Data
May 19, 2016 (JP) ................................. 2016-100733

(51) Int. Cl.
*F16G 11/10* (2006.01)
*A44B 13/00* (2006.01)
*A44B 99/00* (2010.01)

(52) U.S. Cl.
CPC ........ *F16G 11/101* (2013.01); *A44B 13/0035* (2013.01); *A44B 99/00* (2013.01)

(58) Field of Classification Search
CPC .... F16G 11/044; F16G 11/101; F16G 11/103; F16G 11/106; A44B 13/0035
See application file for complete search history.

(56) References Cited

U.S. PATENT DOCUMENTS 3,007,220 A * 11/1961 Hafner .................. F16G 11/101
403/18
5,894,639 A * 4/1999 Boden .................. F16G 11/106
24/115 G
(Continued)

FOREIGN PATENT DOCUMENTS

| JP | 2005-000231 A | 1/2005 |
| JP | 2007-500835 A | 1/2007 |
| JP | 2013-039176 A | 2/2013 |

OTHER PUBLICATIONS

PCT/ISA/210, "International Search Report for International Application No. PCT/JP2017/018417," dated Jul. 18, 2017.

*Primary Examiner* — Robert Sandy
*Assistant Examiner* — David M Upchurch
(74) *Attorney, Agent, or Firm* — Manabu Kanesaka

(57) ABSTRACT

A cord lock includes a female member having a first opening, a second opening, and an insertion passage for a string; and a male member entering one portion into the insertion passage from the first opening, and having, at the one portion, a male-side fastening portion to be fastened to the string inserted to pass through the insertion passage in cooperation with a female-side fastening portion formed inside the insertion passage. Fastening relative to the string is released by a pulling operation of reducing an entering amount of one portion of the male member into the insertion passage relative to the female member by gripping the string pulled out of the first opening, and by a pulling operation of reducing an entering amount of one portion of the male member into the insertion passage relative to the male member by gripping the string pulled out of the second opening.

12 Claims, 13 Drawing Sheets

(56) References Cited

U.S. PATENT DOCUMENTS

| | | | |
|---|---|---|---|
| 6,457,214 B1* | 10/2002 | Boden | F16G 11/101 24/115 M |
| 2004/0250388 A1* | 12/2004 | Martin | A43C 7/00 24/712.5 |
| 2012/0005865 A1* | 1/2012 | Boden | F16G 11/101 24/136 R |
| 2018/0153262 A1* | 6/2018 | Shimizu | F16G 11/106 |
| 2019/0078646 A1* | 3/2019 | Shimizu | F16G 11/101 |

* cited by examiner

CORD LOCK

FIELD OF TECHNOLOGY

The present invention relates to an improvement of a cord lock.

BACKGROUND ART

There is a string fixture including a case through which a string is inserted, and a lock member having an engagement edge providing an engagement force to the string in cooperation with an engagement wall face of the case (see Patent Document 1).

PRIOR ART DOCUMENT

Patent Document

Patent Document 1: Japanese Patent Application Publication No. 2005-231

SUMMARY OF THE INVENTION

Problems to be Solved by the Invention

A main object of the present invention is to further improve an operability of this type of string fixture, i.e., the cord lock.

Means for Solving the Problems

In order to obtain the aforementioned object, in the present invention, a cord lock comprises a female member provided with a first opening, a second opening, and an insertion passage for a string ranging therebetween; and a male member entering one portion thereof into the insertion passage from the first opening side, and including, at the aforementioned one portion, a male-side fastening portion to be fastened to the string inserted to pass through the insertion passage in cooperation with a female-side fastening portion formed inside the insertion passage. Also, the cord lock is formed such that fastening relative to the string is released by a pulling operation of reducing an entering amount of one portion of the male member into the insertion passage relative to the female member by gripping the string pulled out of the first opening side, and by a pulling operation of reducing an entering amount of one portion of the male member into the insertion passage relative to the male member by gripping the string pulled out of the second opening side. Also, the cord lock is formed with finger-hooking portions for the pulling operation in the female member and the male member.

A fastened state of the cord lock relative to the string can be released by the pulling operation relative to the female member by gripping the string pulled out of the first opening side, and by the pulling operation relative to the male member by gripping the string pulled out of the second opening side. In the female member and the male member, there are formed the finger-hooking portions, so that the female member and the male member can be easily pinched upon the pulling operation so as to easily and surely carry out the pulling operation.

In one of aspects of the present invention, the finger-hooking portion is formed in such a way as to follow a direction crossing a length direction of the string.

Also, In one of the aspects of the present invention, the cord lock includes a wide front face portion and a back face portion, and at least in one of the front face portion and the back face portion, there are formed the finger-hooking portions respectively in the female member and the male member.

Also, in one of the aspects of the present invention, the cord lock includes the wide front face portion and the back face portion, and at least one of the front face portion and the back face portion is formed in such a way as to be heightened as coming close to terminal sides of the cord lock from a center side of the cord lock in a length direction of the string so as to fit a fingertip between the two terminals.

Also, in one of the aspects of the present invention, an outer face of the cord lock located between the two terminals becomes a face substantially following an arc of one virtual circle.

Also, in one of the aspects of the present invention, between the female member and the male member, there is interposed a spring member wherein an energy is accumulated by the pulling operation.

Also, in one of the aspects of the present invention, a center axis of the insertion passage is positioned on one virtual flat surface Also, in one of the aspects of the present invention, one of the male-side fastening portion and the female-side fastening portion is a face portion; the other of the male-side fastening portion and the female-side fastening portion is a claw portion projecting toward the face portion; and an angle made by a virtual straight line where at least a side portion facing the first opening side follows in the claw portion, and the face portion becomes a substantially right angle. Also, in one of the aspects of the present invention, a wrapping portion of a belt-shaped member is formed on either one or both of the finger-hooking portion of the female member and the finger-hooking portion of the male member.

Effect of the Invention

According to the present invention, an operability of the cord lock can be adequately and reasonably improved.

BEST MODES OF CARRYING OUT THE INVENTION

Figure 1:
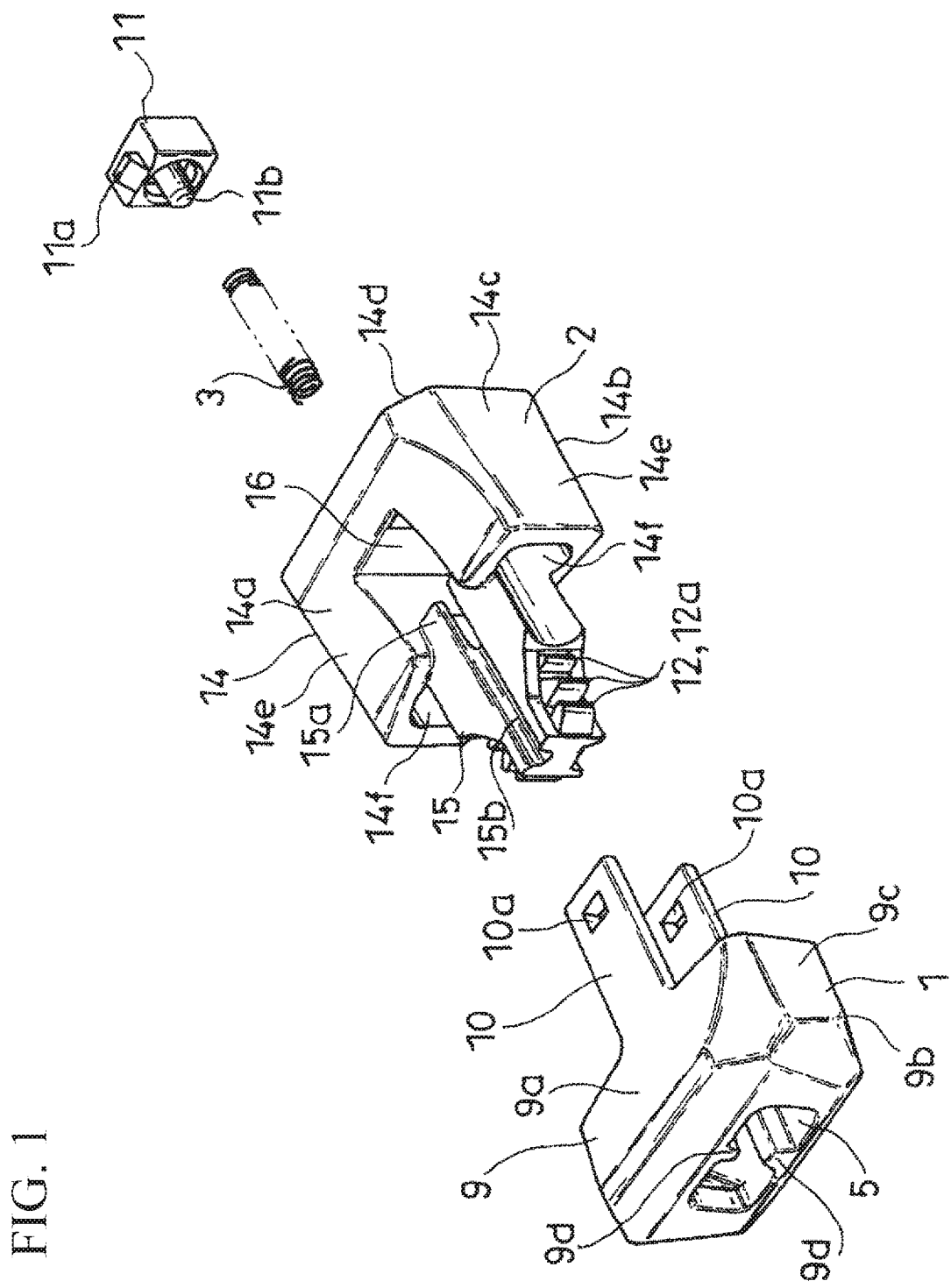
FIG. 1 is an exploded perspective view of a cord lock (the first example) according to one embodiment of the present invention.

Hereinafter, based on FIG. 1 to FIG. 25, typical embodiments of the present invention will be explained.

A cord lock R according to the present embodiment can be fastened to an arbitrary position of a string C, and is formed in such a way as to release this fastened state by a pulling operation of reducing an entering amount of one portion of a male member 2 into a female member 1.

Such string C may have any shape (a round string, a flat string, and the like), any material, or any structure (a knitted string, an elastic string, a string made of synthetic resin, and the like) provided that the cord lock R can be fastened in the aforementioned manner. Typically, such cord lock R is fastened to the string C in various types of articles provided with a portion which is narrowed or tightened by the aforementioned string C, and is used in such a way as to tighten or loosen the aforementioned portion by changing a fastening position thereof.

As shown in FIGS. 10, 14, 17, 20, and 21, the female member 1 comprises a first opening 4, a second opening 5, and an insertion passage 6 for the string C ranging therebetween.

On the other hand, the male member 2 enters one portion thereof into the insertion passage 6 from the first opening 4 side, and includes, at the aforementioned one portion, male-side fastening portions 12 to be fastened to the string C inserted to pass through the insertion passage 6 in cooperation with female-side fastening portions 7 formed inside the insertion passage 6.

Fastening relative to the string C is released by the pulling operation of reducing the entering amount of one portion of the male member 2 into the insertion passage 6 relative to the female member 1 by gripping the string C pulled out of the first opening 4 side, and the pulling operation of reducing the entering amount of one portion of the male member 2 into the insertion passage 6 relative to the male member 2 by gripping the string C pulled out of the second opening 5 side.

Also, as shown in FIGS. 3, 13, 22, 23, and 25, in the female member 1 and the male member 2, there are respectively formed finger-hooking portions 8 and 13 for the pulling operation.

The fastened state of the cord lock R relative to the string C can be released by a pulling operation relative to the female member 1 by gripping the string C which is pulled out of the first opening 4 side, and by a pulling operation relative to the male member 2 by gripping the string C which is pulled out of the second opening 5 side. Since the finger-hooking portions 8 and 13 are formed in the female member 1 and the male member 2, upon the pulling operations, the female member 1 and the male member 2 are easily pinched, and the pulling operations can be easily and surely carried out.

First Example

In the first example shown in FIG. 1 to FIG. 12, in the cord lock R, the string C passes through respectively both sides sandwiching a moving center axis x (see FIG. 10) of the male member 2.

Figure 8:
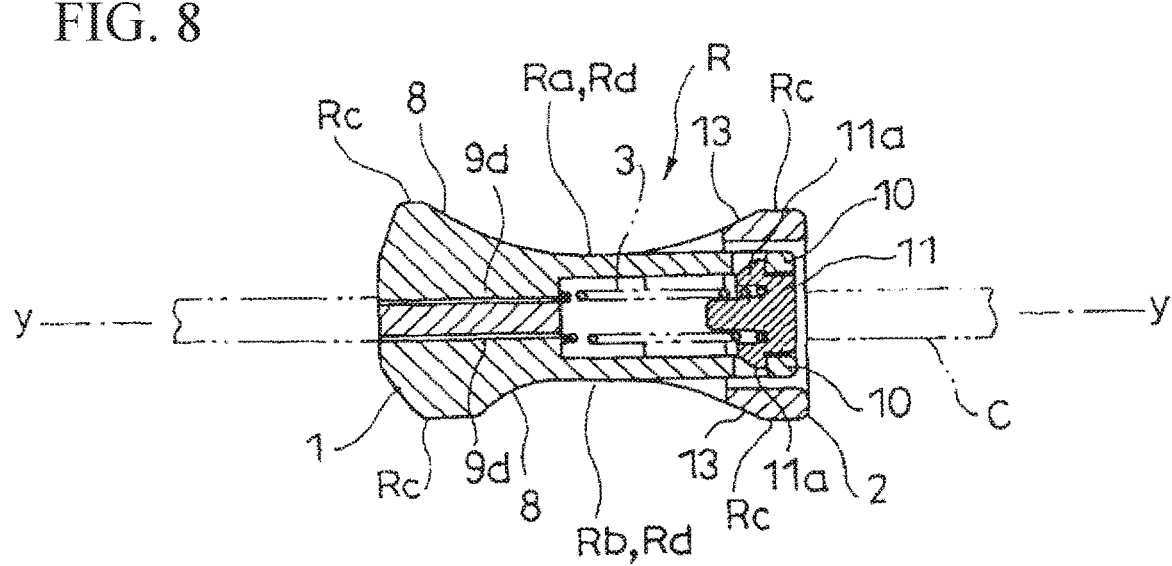
FIG. 8 is a cross-sectional view at an A-A line position in FIG. 7.
Figure 9:
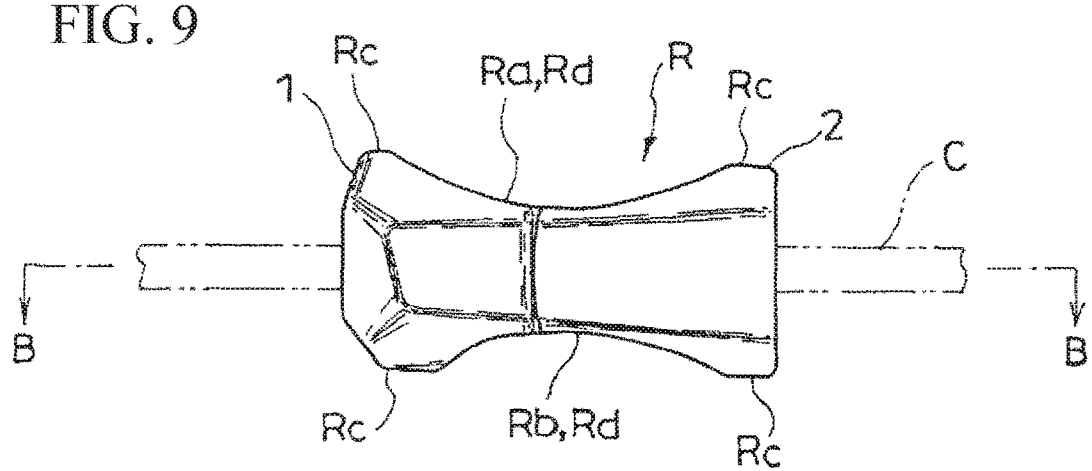
FIG. 9 is a side view of the first example, and shows a state wherein the cord lock is fastened to the string.

As shown in FIG. 8 and FIG. 9, the cord lock R includes a wide front face portion Ra and a back face portion Rb. Also, in an illustrated example, both of the front face portion Ra and the back face portion Rb are formed in such a way as to be heightened as coming close to terminals Rc sides of the cord lock R from a center side of the cord lock R in a length direction of the string C, and have a shape on which a fingertip can be fitted between two terminals Rc and Rc.

In the first example, one of the two terminals Rc and Rc is formed in the female member 1, and the other of the two terminals Rc and Rc is formed in the male member 2. Thereby, the finger-hooking portions 8 and 13 are respectively formed in the female member 1 and the male member 2. In the first example, the cord lock R can be firmly gripped in such a way that a finger cushion is fitted on the front face portion Ra and the back face portion Rb of the cord lock R. Then, from this gripped state, when the female member 1 is operated to be pulled to a left side in FIG. 10 by gripping the string C pulled out of the first opening 4 side, a finger is caught on the finger-hooking portion 8 of the female member 1 so as to carry out the pulling operation favorably. Also, when the male member 2 is operated to be pulled to a right side in FIG. 10 by gripping the string C pulled out of the second opening 5 side, a finger is caught on the finger-hooking portion 13 of the male member 2 so as to carry out the pulling operation favorably. When the female member 1 is operated to be pulled to the left side in FIG. 10 by gripping the string C pulled out of the first opening 4 side, the fastened state of the cord lock R relative to the string C is released, and the cord lock R moves to the left side in FIG. 10 as a whole. When the pulling operation to the left side is stopped, at a position after the movement, the cord lock R is fastened to the string C again. Also, when the male member 2 is operated to be pulled to the right side in FIG. 10 by gripping the string C pulled out of the second opening 5 side, the fastened state relative to the string C of the cord lock R is released, and the cord lock R moves to the right side in FIG. 10 as a whole. When the pulling operation to the right side is stopped, at a position after the movement, the cord lock R is fastened to the string C again.

Namely, in the first example, the finger-hooking portions 8 and 13 are formed along a width direction (a direction orthogonal to the moving center axis x) of the front face portion Ra and the back face portion Rb in such a way as to follow a direction of crossing the length direction of the string C.

In the illustrated example, as shown in FIG. 8 and FIG. 9, an outer face of the cord lock R located between the two terminals Rc and Rc becomes a face Rd substantially following an arc of one virtual circle.

Figure 2:
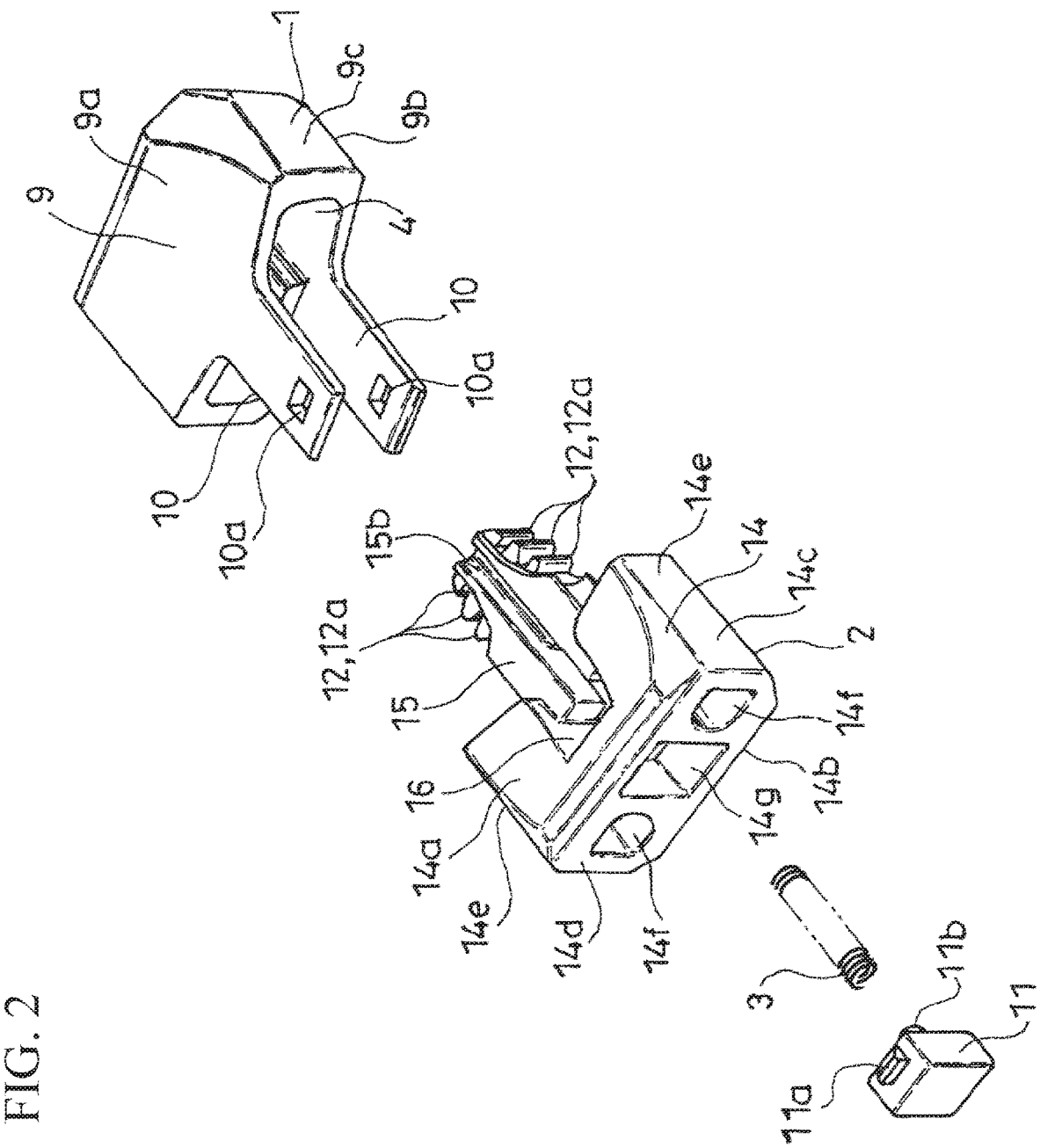
FIG. 2 is an exploded perspective view of the first example.
Figure 3:
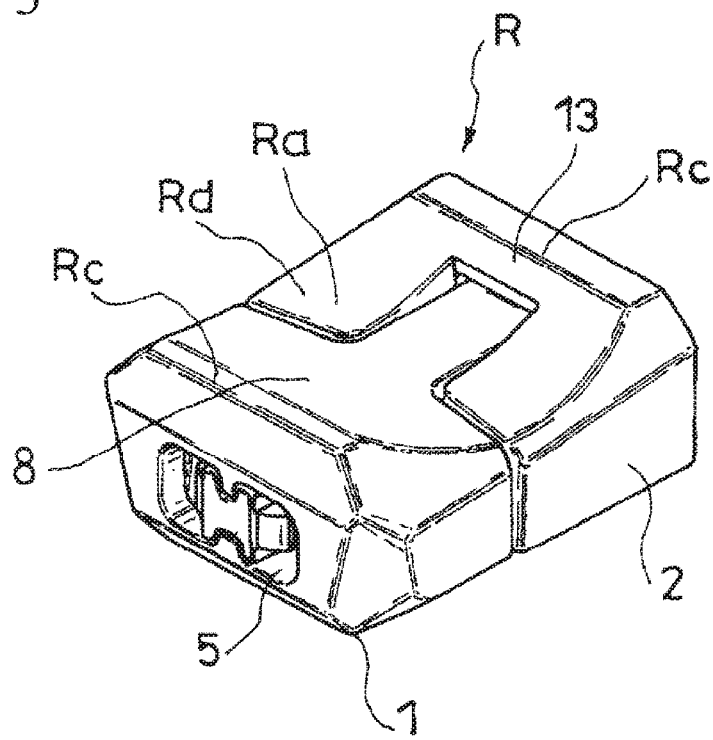
FIG. 3 is a perspective view of the first example.
Figure 4:
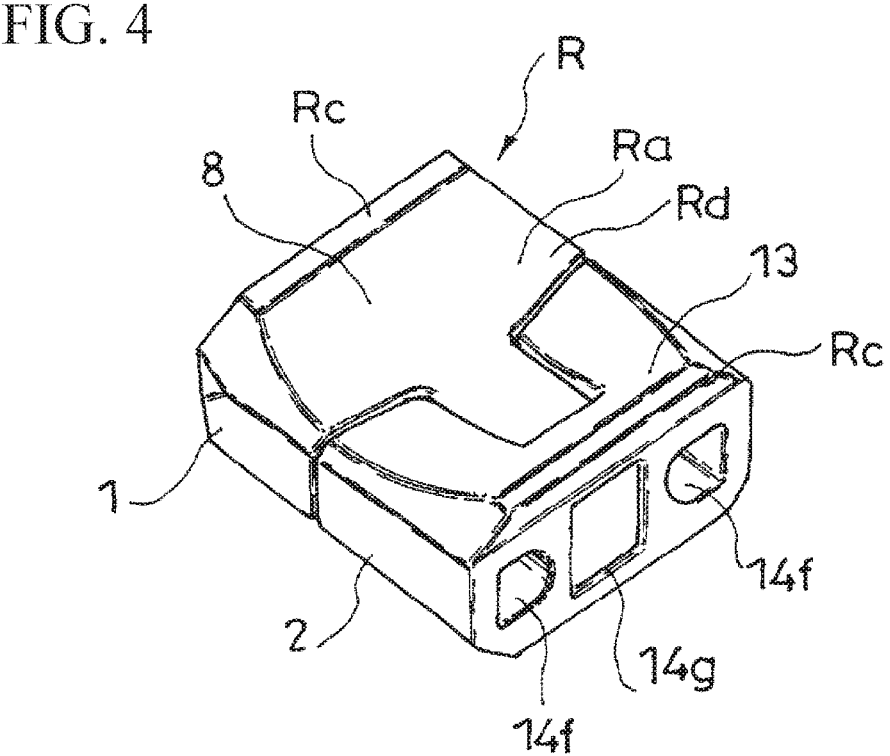
FIG. 4 is a perspective view of the first example.
Figure 5:
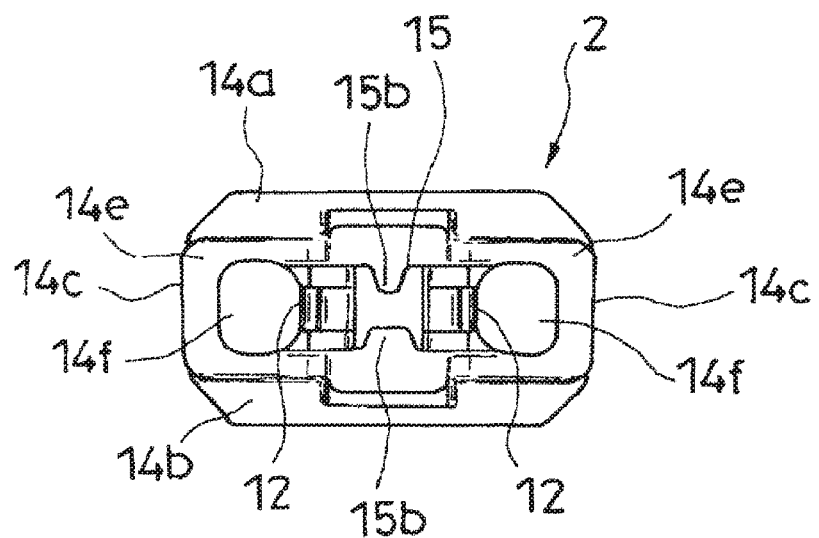
FIG. 5 is a side view of a male member forming the first example.
Figure 6:
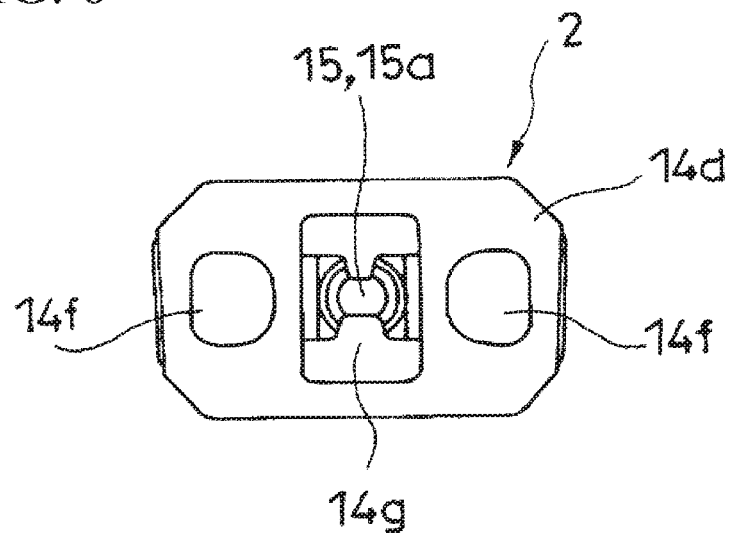
FIG. 6 is a side view of the male member forming the first example.
Figure 7:
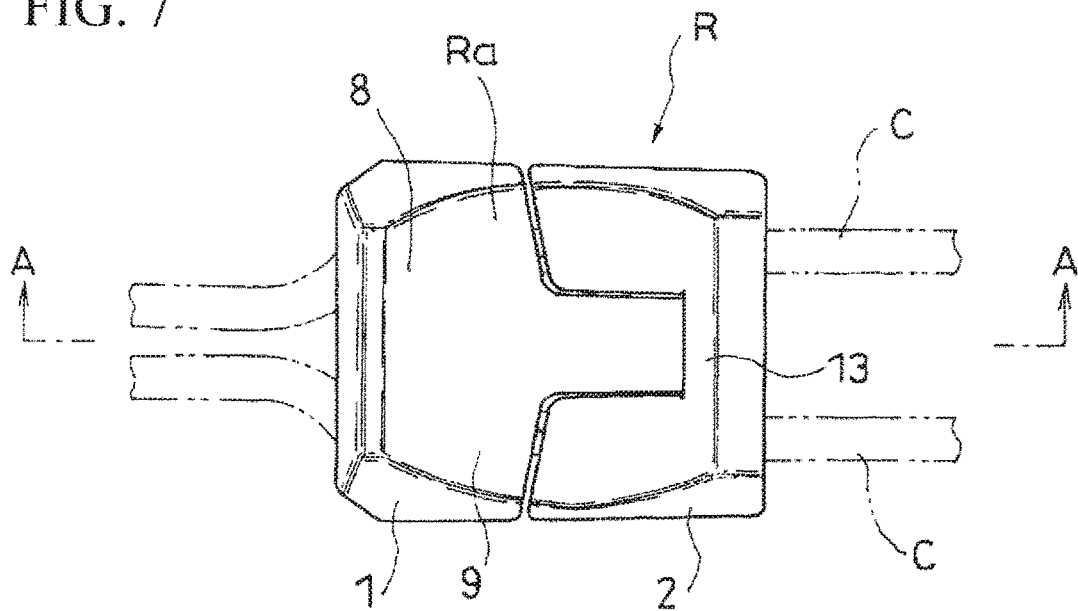
FIG. 7 is a front view of the first example, and shows a state wherein the cord lock is fastened to a string.

As shown in FIG. 1 and FIG. 2, the female member 1 comprises a female-side main member portion 9, female-side leg portions 10, and a spring holding member 11.

The female-side main member portion 9 includes a female-side front face portion 9a which becomes one portion of the front face portion Ra; a female-side back face portion 9b which becomes one portion of the back face portion Rb; and female-side side face portions 9c formed in a direction along the moving center axis x, and the female-side main member portion 9 substantially has a flat square cylindrical shape in cross section in the direction orthogonal to the moving center axis x. One cylinder end of the female-side main member portion 9 serves as the first opening 4, and the other cylinder end of the female-side main member portion 9 serves as the second opening 5.

As shown in FIG. 1, on an inner face of the female-side front face portion 9a and an inner face of the female-side back face portion 9b of the female-side main member portion 9, there are respectively formed guide ribs 9d along the moving center axis x.

Figure 10:
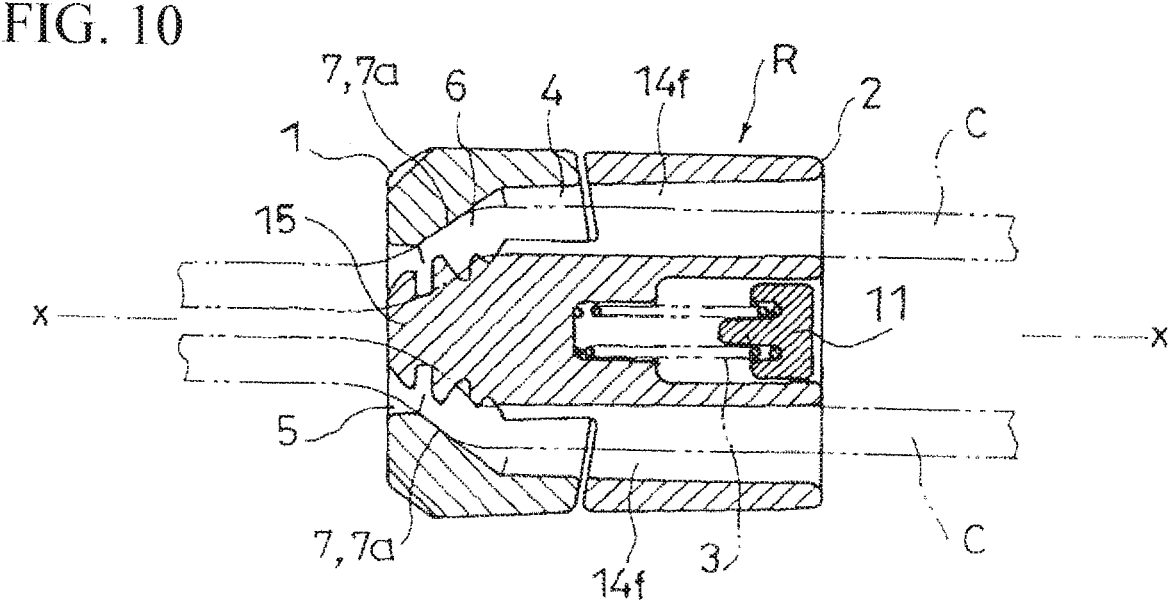
FIG. 10 is a cross-sectional view at a B-B line position in FIG. 9.

As shown in FIG. 10, inner faces of the female-side side face portions 9c of the female-side main member portion 9 are substantially parallel to the moving center axis x between an approximately intermediate position between the first opening 4 and the second opening 5, and the first opening 4, however, between the aforementioned intermediate position and the second opening 5, the inner faces of the female-side side face portions 9c become face portions 7a serving as the female-side fastening portions 7 inclining in a direction of reducing an inner diameter of the female-side main member portion 9 as coming close to the second opening 5.

As shown in FIG. 2, the female-side leg portions 10 have a band plate shape projecting from an edge portion forming the first opening 4 in the female-side main member portion 9 along the moving center axis x. Two female-side leg portions 10 are provided. One of the two female-side leg portions 10 and 10 continues to the female-side front face portion 9a, and extends along the moving center axis x. The other of the two female-side leg portions 10 and 10 continues to the female-side back face portion 9b, and extends along the moving center axis x.

At projecting ends of the two female-side leg portions 10 and 10, there are respectively formed quadrangular through holes 10a.

As shown in FIG. 8, both of inner and outer faces of the female-side leg portions 10 are parallel to the moving center axis x. On the other hand, an outer face of the female-side front face portion 9a of the female-side main member portion 9 becomes the face Rd substantially following the arc of the one virtual circle in such a way as to gradually increase a thickness of the female-side main member portion 9 gradually toward the second opening 5 side. Also, an outer face of the female-side back face portion 9b becomes the face Rd substantially following the arc of the one virtual circle in such a way as to gradually increase a thickness of the female-side main member portion 9 gradually toward the second opening 5 side.

As shown in FIG. 8 and FIG. 10, the spring holding member 11 has a thickness which can be housed between the two female-side leg portions 10 and 10 without any gap, and a width substantially equal to a width of the female-side leg portions 10. As shown in FIG. 1, FIG. 2, and FIG. 8, the spring holding member 11 includes engagement projections 11a to engage the through holes 10a of the female-side leg portions 10 respectively on the front face and the back face thereof, and is attached in such a way as to be built between the projecting ends of the two female-side leg portions 10 and 10 by housing the engagement projections 11a in the through holes 10a. On a face portion facing the first opening 4 in the spring holding member 11 attached in the aforementioned manner, there is formed a projecting portion 11b to enter into one spring end of the later-described spring member 3.

On the other hand, as shown in FIG. 1, the male member 2 comprises a male-side main member portion 14 and a male-side leg portion 15.

The male-side main member portion 14 includes a male-side front face portion 14a which becomes one portion of the front face portion Ra; a male-side back face portion 14b which becomes one portion of the back face portion Rb; and male-side side face portions 14c formed in the direction along the moving center axis x.

The male-side main member portion 14 comprises an end portion 14d long in a direction orthogonal to the moving center axis x; a projection portion 14e projecting in such a way as to follow the moving center axis x from a left end portion of the end portion 14d in FIG. 1 on a side facing the first opening 4 in the end portion 14d; and a projection portion 14e projecting in such a way as to follow the moving center axis x from a right end portion of the end portion 14d in FIG. 1.

As shown in FIG. 9, an outer face of the male-side front face portion 14a of the male-side main member portion 14 becomes the face Rd substantially following the arc of the one virtual circle in such a way as to gradually increase a thickness of the male-side main member portion 14 gradually toward an end portion 14d side. Also, an outer face of the male-side back face portion 14b becomes the face Rd substantially following the arc of the one virtual circle in such a way as to gradually increase a thickness of the male-side main member portion 14 gradually toward the end portion 14d side.

As shown in FIG. 1 and FIG. 2, there are formed insertion passages 14f for the string C respectively between an end portion facing the first opening 4 of the projection portion 14e projecting from a left side of the end portion 14d and a side opposite to the side facing the first opening 4 in the end portion 14d; and between the end portion facing the first opening 4 of the projection portion 14e projecting from a right side of the end portion 14d and the side opposite to the side facing the first opening 4 in the end portion 14d.

The male-side leg portion 15 has a thickness thereof which can be housed between the two female-side leg portions 10 and 10, and a width thereof which can be housed inside the female-side main member portion 9. The male-side leg portion 15 integrates a base portion 15a thereof with projecting ends of the right and left projection portions 14e and 14e, and projects from the male-side main member portion 14 in such a way as to follow the moving center axis x.

Also, as shown in FIG. 1 and FIG. 2, there is formed a space 16 between the base portion 15a of the male-side leg portion 15 and the end portion 14d, and in the end portion 14d, there is formed a window hole 14g communicating with the space 16.

Also, on a front face and a back face of the male-side leg portion 15, there are respectively formed guide grooves 15b in which the guide ribs 9d can be housed along a leg end thereof and the base portion.

Also, between a position in an approximately middle in a projecting direction of the male-side leg portion 15, and the leg end, there are formed claw portions 12a which become the male-side fastening portions 12 respectively on the right and left of the male-side leg portion 15. The claw portions 12a project from side faces on a thickness side of the male-side leg portion 15, and three claw portions 12a are formed at intervals between adjoining claw portions 12a in the direction along the moving center axis x.

Also, in the first example, as shown in FIG. 8, between the female member 1 and the male member 2, there is interposed a compression coil spring as the spring member 3 wherein an energy is accumulated by the pulling operation.

As shown in FIG. 10, on both sides sandwiching the moving center axis x, respectively, the string C pulled out of the first opening 4 from the second opening 5 of the female member 1 through the insertion passage 6 is passed through the insertion passages 14f of the male member 2. From that state, the male-side leg portion 15 moves into the female-side main member portion 9 through the portion between the two female-side leg portions 10 and 10 of the female member 1 and the first opening 4 up to a position where the projecting ends of the female-side leg portions 10 are positioned in the space 16 in such a way that the guide ribs 9d are housed in the guide grooves 15b. From that state, the compression coil spring as the spring member 3 is disposed inside the male member 2 in such a way as to abut the other spring end against the base portion 15a of the male-side leg portion 15 through the window hole 14g. Also, the spring holding member 11 is housed between the two female-side leg portions 10, and the spring holding member 11 and the female-side leg portions 10 are engaged in the aforementioned manner. Thereby, the male member 2 and the female member 1 are integrated in a state wherein the string C is passed respectively through the right and left of the moving center axis x. The spring member 3 is disposed in such a way as to accumulate the energy by the pulling operation. Therefore, in a state wherein such pulling operation is not carried out, an entering amount of the male-side leg portion 15 as one portion of the male member 2 into the female-side main member portion 9 as the insertion passage 6 of the female member 1 is maximized. In that state, the claw portions 12a as the male-side fastening portions 12 are disposed in such a way as to project toward the face portions 7a as the female-side fastening portions 7. Also, the face portions 7a incline in the direction of reducing the inner diameter of the female-side main member portion 9 as the insertion passage 6 as coming close to the second opening 5, so that the string C is tightened between the claw portions 12a and the face portions 7a, and the claw portions 12a bite into the string C. Thereby, the cord lock R is fastened relative to the string C.

Figure 12:
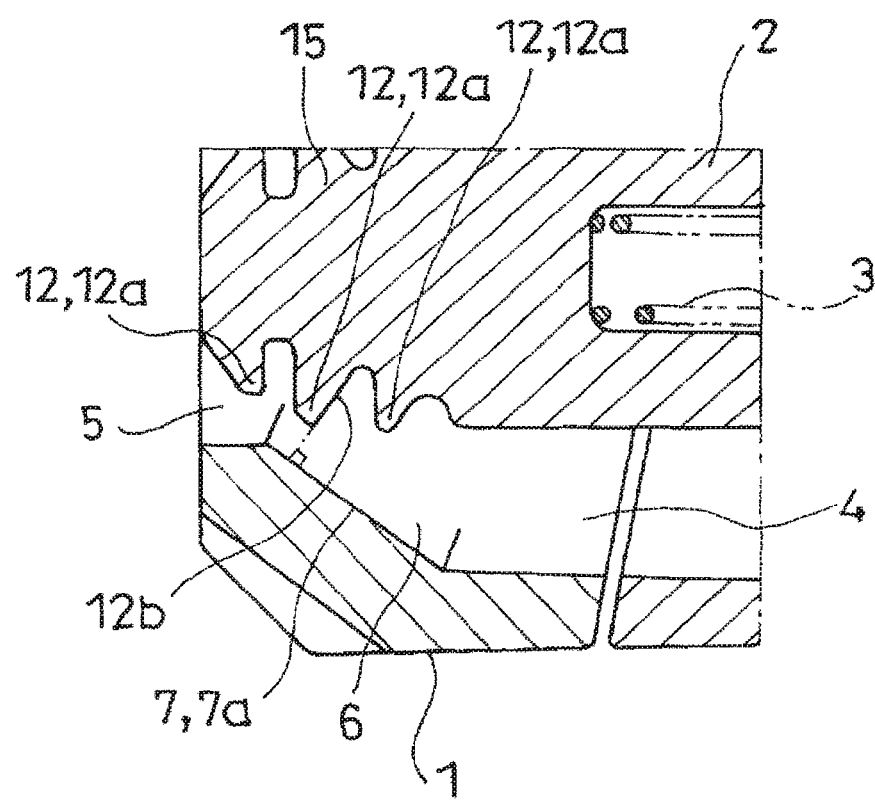
FIG. 12 is a cross-sectional view of essential parts of the first example.

In the illustrated example, an angle made by a virtual straight line (in FIG. 12, shown by a dashed line) where a side portion 12b facing the first opening 4 side follows in the claw portion 12a positioned in the middle of three claw portions 12a . . . 12a respectively formed on the right and left of the male-side leg portion 15, and the face portion 7a becomes a substantially right angle (see FIG. 12). Thereby, in the illustrated example, the claw portions 12a bite into the string C with a high holding force.

Figure 11:
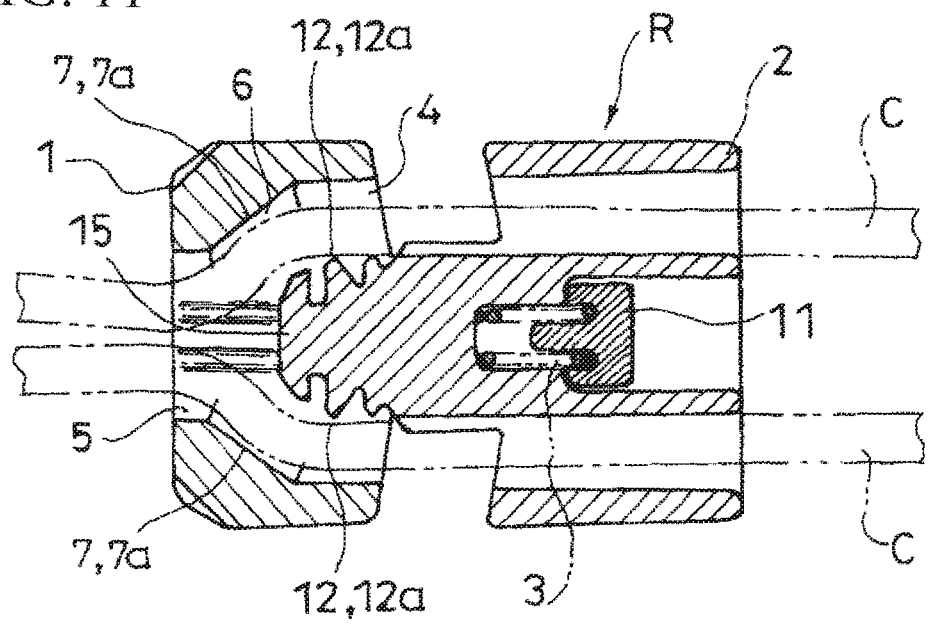
FIG. 11 is a cross-sectional view of the first example, and shows a state wherein the cord lock is released from the fastening to the string.

When the pulling operation is carried out, while compressing the compression coil spring as the spring member 3 and accumulating the energy, the entering amount of the male-side leg portion 15 as one portion of the male member 2 into the female-side main member portion 9 of the female member 1 as the insertion passage 6 is reduced, and a distance between the face portions 7a and the claw portions 12a extends, so that the tightening of the string C between the face portions and the claw portions 12a is loosened, and the fastening of the cord lock R relative to the string C is released (FIG. 10 to FIG. 11).

Incidentally, in the first example, a center axis y (see FIG. 8) of the insertion passage 6 for the string C in the female member 1 is positioned on one virtual flat surface, and in a state wherein the fastening of the cord lock R relative to the string C is released, there is no portion which particularly becomes a catch on the string C except for the claw portions 12a so as to smoothly move the cord lock R along the string C to a desired position.

Second Example

Figure 13:
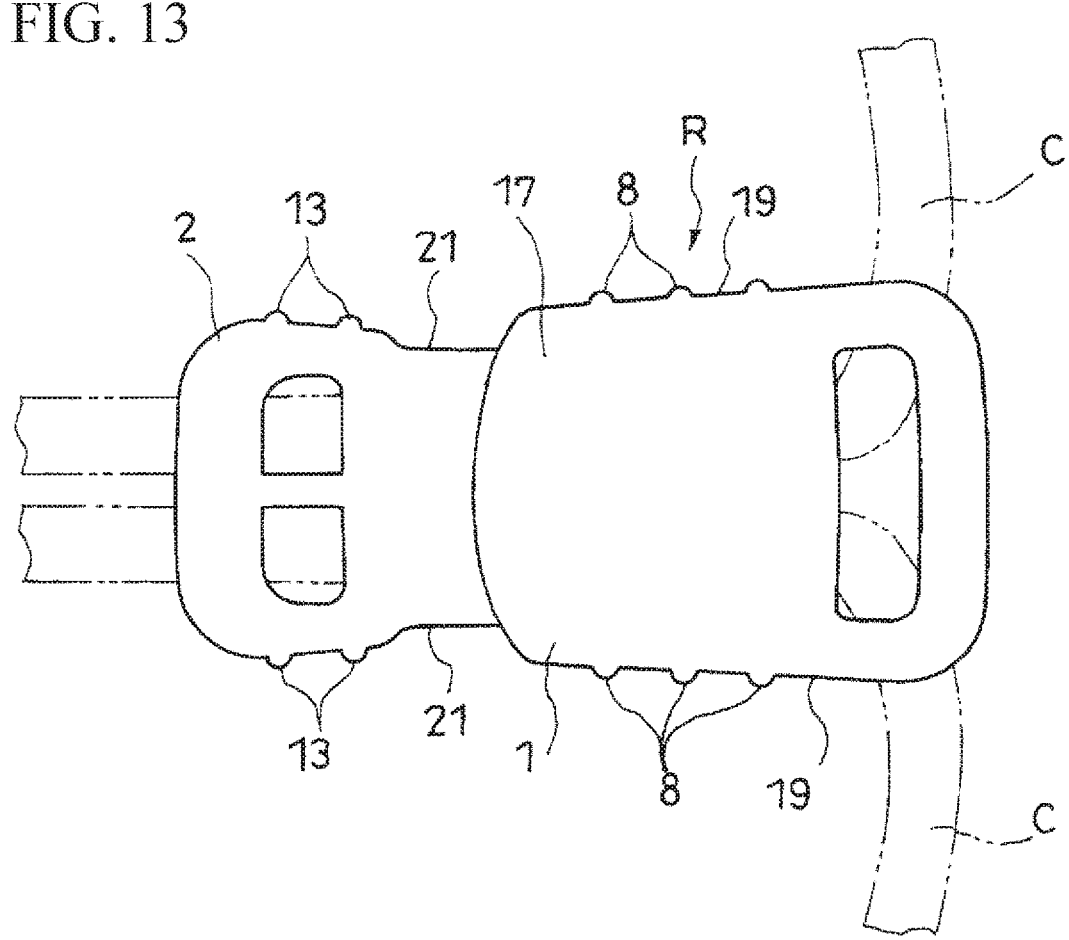
FIG. 13 is a front view of the cord lock (a second example) according to one embodiment of the present invention.
Figure 14:
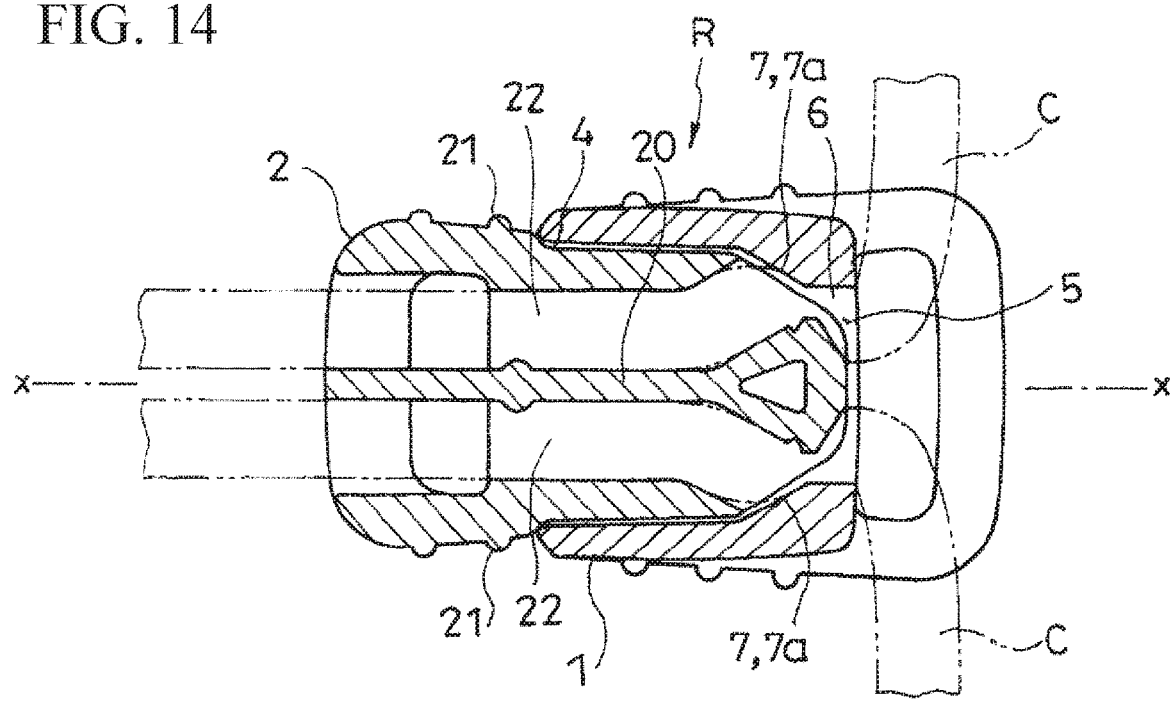
FIG. 14 is a cross-sectional view of the second example, and shows a state wherein the cord lock is fastened to the string.
Figure 15:
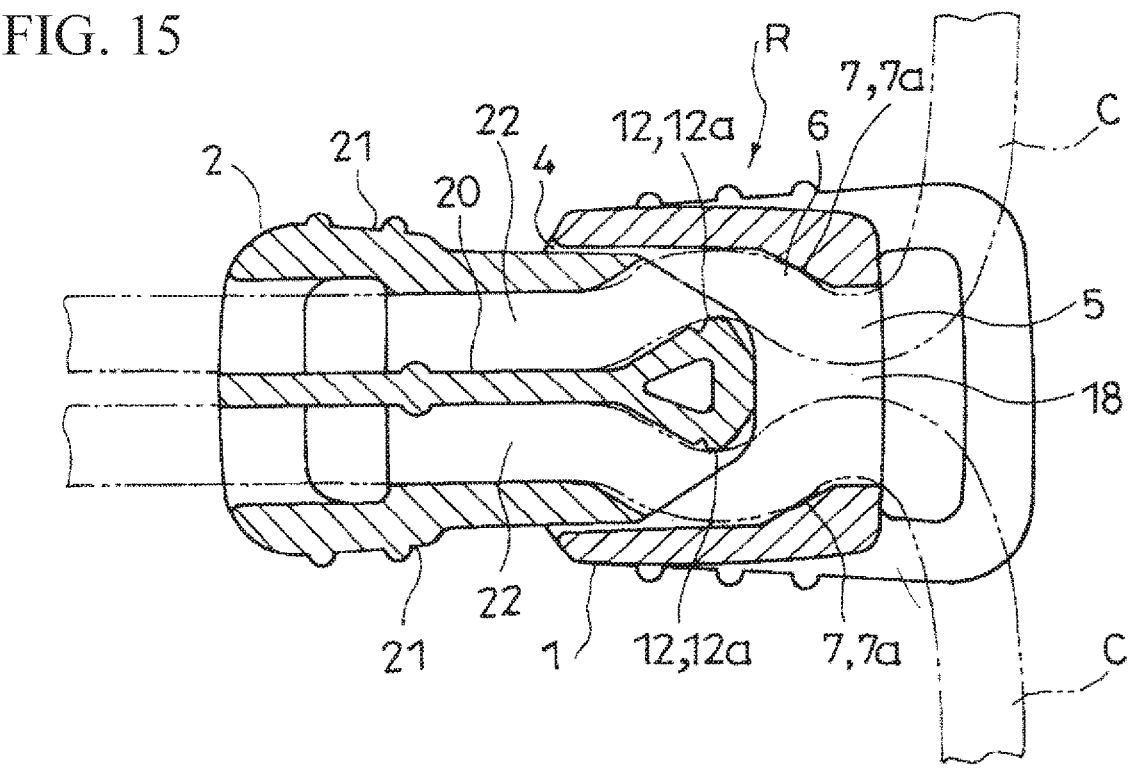
FIG. 15 is a cross-sectional view of the second example, and shows a state wherein the fastening to the string is released.

In a second example shown in FIG. 13 to FIG. 15, in the cord lock R, the string C passes through respectively both sides sandwiching the moving center axis x of the male member 2.

In the second example, unlike the first example, the cord lock R is formed by the female member 1 and the male member 2 without the spring member 3.

As shown in FIG. 14, the female member 1 has a cylindrical shape comprising the first opening 4, the second opening 5, and the insertion passage 6 for the string C ranging therebetween.

In the example, the female member 1 comprises a wide surface portion 17, a reverse portion 18, and side portions 19. In inner faces of the side portions 19, portions positioned on the second opening 5 side become the face portions 7a inclining so as to gradually reduce an inner diameter of the female member 1 as coming close to the second opening 5.

As shown in FIG. 15, the male member 2 enters one portion thereof into the insertion passage 6 from the first opening 4 side, and at the aforementioned one portion, comprises the male-side fastening portions 12 to be fastened to the string C inserted to pass through the insertion passage 6 in cooperation with the face portions 7a as the female-side fastening portions 7 formed inside the insertion passage 6.

In the example, as shown in FIG. 14, the male member 2 includes a core portion 20 along the moving center line x, and side portions 21 along the moving center line x respectively on both sides of the core portion 20, and has a cylindrical shape forming an insertion passage 22 for the string C between the core portion 20 and the side portions 21. On a side which enters into the female member 1, the core portion 20 projects to a right side in FIG. 15 more than the side portions 21, and at the aforementioned projecting portions, there are formed the claw portions 12a which become the male-side fastening portions 12.

In the example, as shown in FIG. 15, the male-side fastening portions 12 which are one portion of the male member 2 enter into the female member 1 by a tensile force acting on the string C. Thereby, as shown in FIG. 14, the string C is tightened between the face portions 7a and the claw portions 12a, and the claw portions 12a bite into the string C so as to fasten the cord lock R relative to the string C.

Then, in this example as well, the fastening relative to the string C is released by the pulling operation of reducing the entering amount of one portion of the male member 2 into the insertion passage 6 relative to the female member 1 by gripping the string C pulled out of the first opening 4 side, and by the pulling operation of reducing the entering amount of one portion of the male member 2 into the insertion passage 6 relative to the male member 2 by gripping the string C pulled out of the second opening 5 side.

Also, in this example as well, as shown in FIG. 13, in the female member 1 and the male member 2, there are formed the finger-hooking portions 8 and 13 for the pulling operation. In the illustrated example, the finger-hooking portions 8 of the female member 1 are formed by projecting portions formed on outer faces of the side portions 19 of the female member 1. Also, the finger-hooking portions 13 of the male member 2 are formed by projecting portions formed on outer faces of the side portions 21 of the male member 2.

Third Example

In a third example shown in FIG. 16 to FIG. 19, in the cord lock R, one string C passes through on the moving center axis x of the male member 2.

In the third example, unlike the first example, the cord lock R is formed by the female member 1 and the male member 2 without the spring member 3.

The female member 1 has the cylindrical shape comprising the first opening 4, the second opening 5, and the insertion passage 6 for the string C ranging therebetween.

Figure 18:
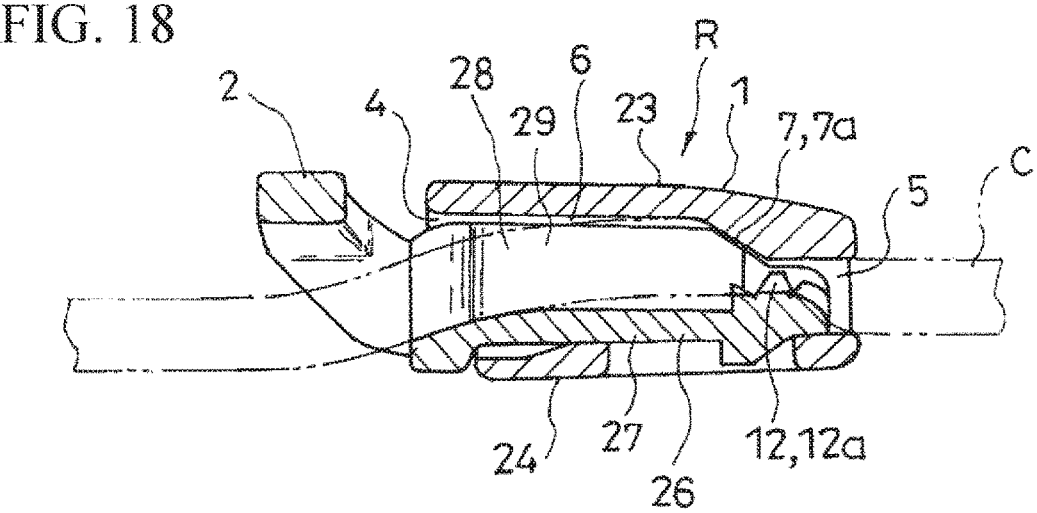
FIG. 18 is a cross-sectional view of the third example, and shows a state wherein the cord lock is fastened to the string.
Figure 19:
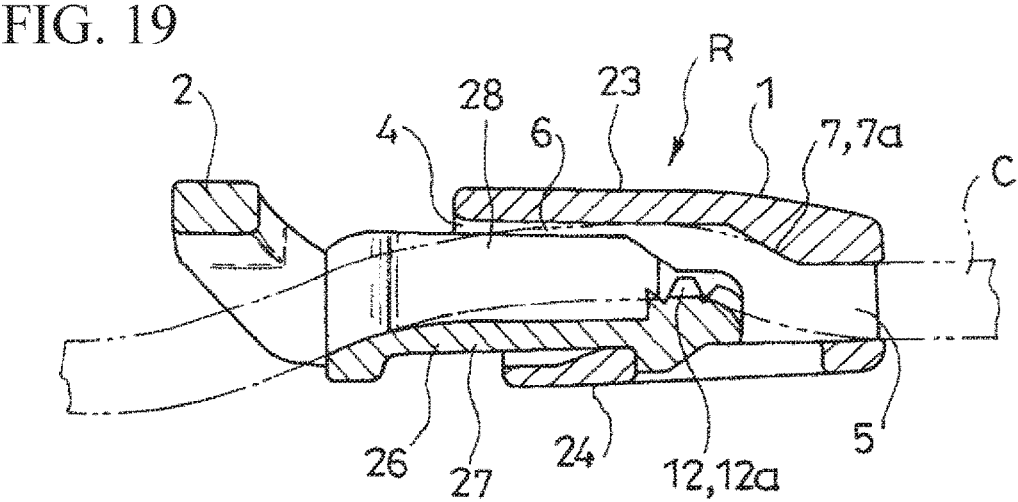
FIG. 19 is a cross-sectional view of the third example, and shows a state wherein the fastening to the string is released.

In the example, the female member 1 comprises a wide surface portion 23, a reverse portion 24, and side portions 25. As shown in FIG. 18 and FIG. 19, in an inner face of the surface portion 23, portions positioned on the second opening 5 side become the face portions 7a inclining so as to gradually reduce the inner diameter of the female member 1 as coming close to the second opening 5.

The male member 2 enters one portion thereof into the insertion passage 6 from the first opening 4 side, and at the aforementioned one portion, comprises the male-side fastening portions 12 to be fastened to the string C inserted to pass through the insertion passage 6 in cooperation with the face portions 7a as the female-side fastening portions 7 formed inside the insertion passage 6.

Figure 17:
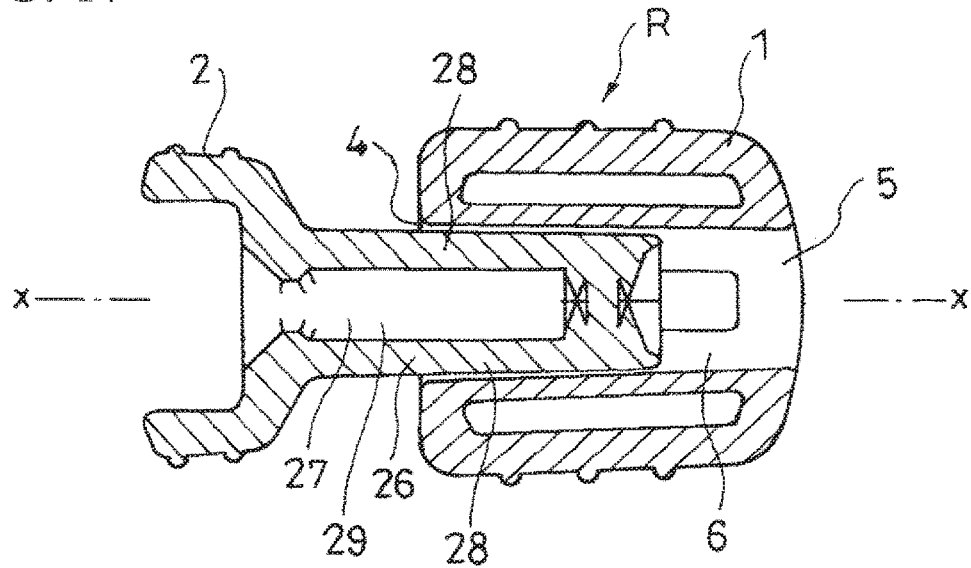
FIG. 17 is a cross-sectional view of the third example.

In the example, as shown in FIG. 17, the male member 2 includes a core portion 26 along the moving center line x. The core portion 26 has a structure comprising a base portion 27 and side portions 28 along the moving center line x respectively formed on both sides of the base portion 27, and forming an insertion passage 29 for the string C between the base portion 27 and two side portions 28 and 28. On a side which enters into the female member 1, the base portion 27 projects to a right side in FIG. 18 more than the side portions 28, and at the aforementioned projecting portion, there are formed the claw portions 12a which become the male-side fastening portions 12.

In the example, the male member 2 enters the one portion thereof into the female member 1 by the tensile force acting on the string C. Thereby, the string C is tightened between the face portions 7a and the claw portions 12a, and the claw portions 12a bite into the string C so as to fasten the cord lock R relative to the string C.

Then, in this example as well, the fastening relative to the string C is released by the pulling operation of reducing the entering amount of the one portion of the male member 2 into the insertion passage 6 relative to the female member 1 by gripping the string C pulled out of the first opening 4 side, and the pulling operation of reducing the entering amount of the one portion of the male member 2 into the insertion passage 6 relative to the male member 2 by gripping the string C pulled out of the second opening 5 side.

Figure 16:
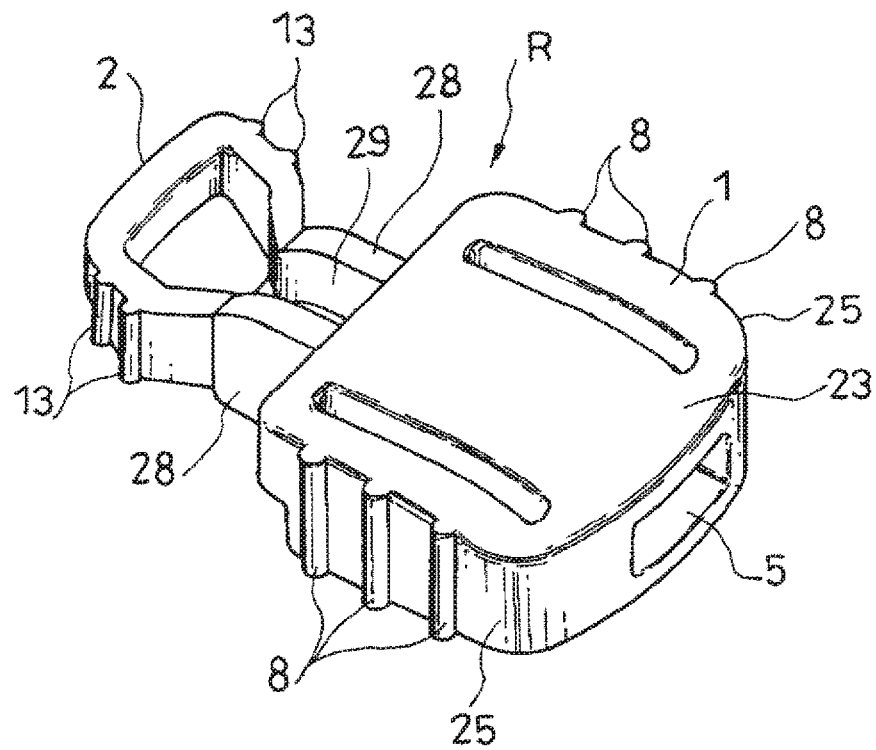
FIG. 16 is a perspective view of the cord lock (a third example) according to one embodiment of the present invention.

Also, in this example as well, as shown in FIG. 16, in the female member 1 and the male member 2, there are formed the finger-hooking portions 8 and 13 for the pulling operation. In the illustrated example, the finger-hooking portions 8 of the female member 1 are formed by projecting portions formed on outer faces of the side portions 25 of the female member 1. Also, the finger-hooking portions 13 of the male member 2 are formed by projecting portions formed on outer faces of the side portions 28 of the male member 2.

Fourth Example

Figure 20:
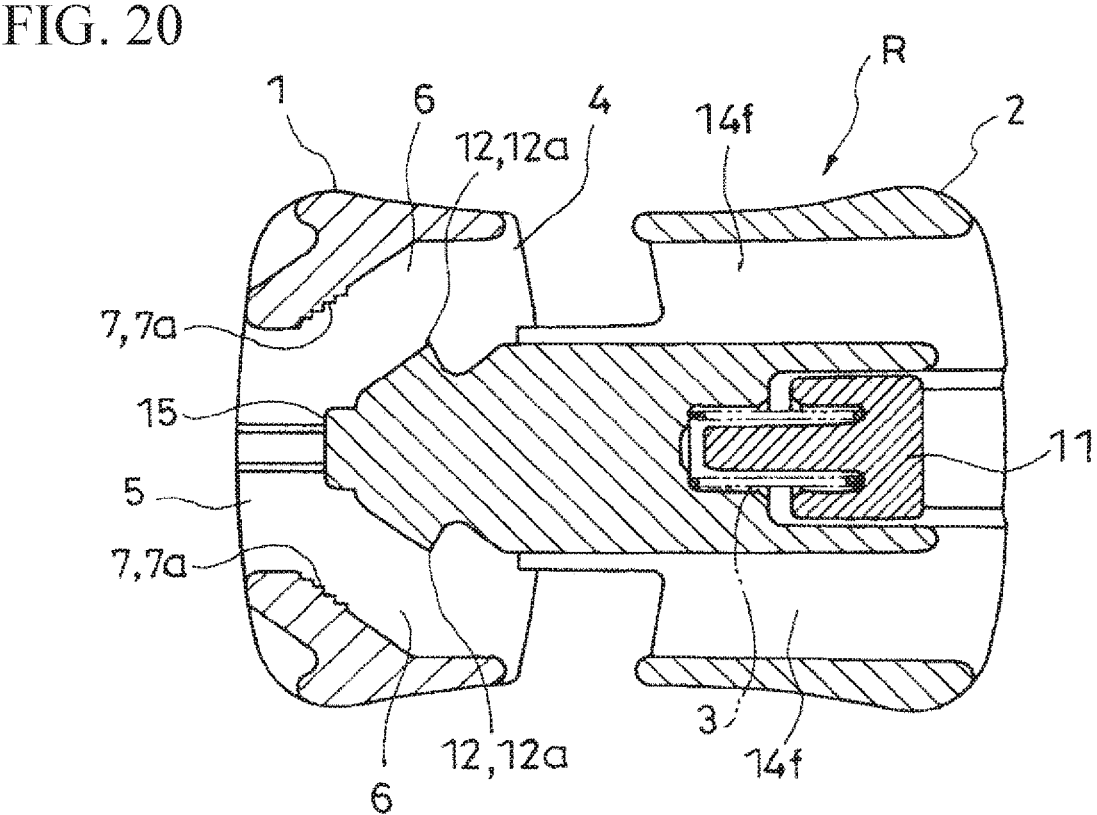
FIG. 20 is a cross-sectional view of the cord lock (a fourth example) according to one embodiment of the present invention.

FIG. 20 shows a partially modified example (a fourth example) from a structure of the first example. The fourth example shows an example wherein minute dents and projections are formed in the face portions 7a as the female-side fastening portions 7 of the female member 1, and only one of the claw portions 12a as the male-side fastening portions 12 of the male member 2 is formed respectively on the right and left of the male-side leg portion 15.

Fifth Example

Figure 21:
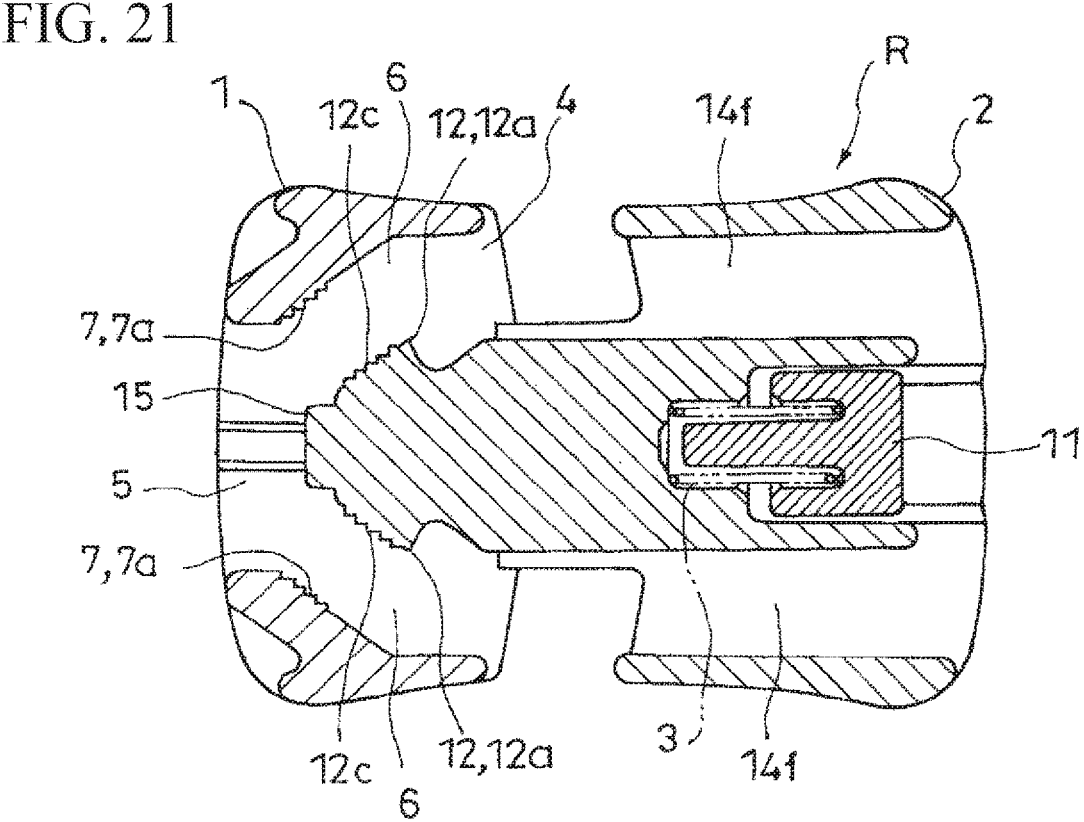
FIG. 21 is a cross-sectional view of the cord lock (a fifth example) according to one embodiment of the present invention.

FIG. 21 shows a partially modified example (a fifth example) from the structure of the first example. The fifth example shows an example wherein minute dents and projections are formed in the face portions 7a as the female-side fastening portions 7 of the female member 1, and only one of the claw portions 12a as the male-side fastening portions 12 of the male member 2 is formed respectively on the right and left of the male-side leg portion 15. Then, in the fifth example, minute dents and projections are formed in side portions 12c facing the face portions 7a in the claw portions 12a as the male-side fastening portions 12 as well.

Sixth Example

Figure 22:
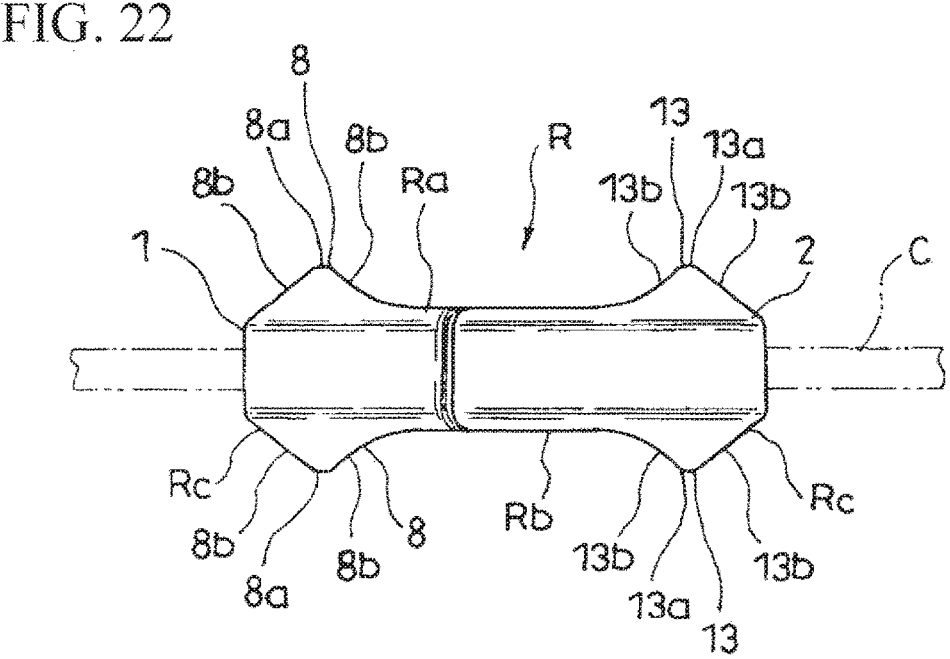
FIG. 22 is a side view of the cord lock (a sixth example) according to one embodiment of the present invention.

FIG. 22 shows a partially modified example (a sixth example) from the structure of the first example. In the sixth example, the cord lock R includes the wide front face portion Ra and the back face portion Rb. Also, in the illustrated example, both of the front face portion Ra and the back face portion Rb are formed in such a way as to be heightened as coming close to the terminals Rc sides of the cord lock R from the center side of the cord lock R in the length direction of the string C, and have the shape on which a fingertip can be fitted between the two terminals Rc and Rc. In the sixth example, one of the two terminals Rc and Rc is formed in the female member 1, and the other of the two terminals Rc and Rc is formed in the male member 2. Thereby, the finger-hooking portions 8 and 13 are respectively formed in the female member 1 and the male member 2. In the sixth example, the finger-hooking portions 8 and 13 respectively have top portions 8a and 13a, and include slope faces 8b and 13b respectively on a center side of the cord lock R sandwiching the top portions 8a and 13a, and on a side opposite to the aforementioned center side of the cord lock R.

Seventh Example

Figure 23:
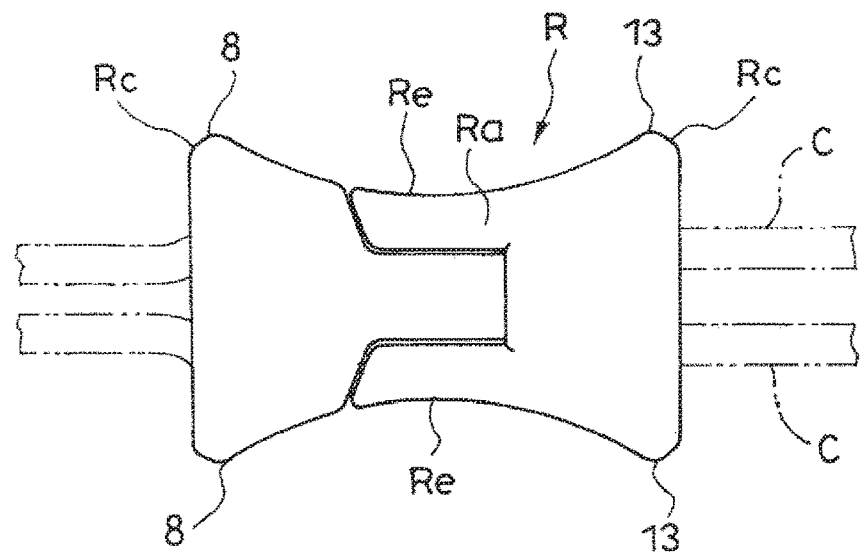
FIG. 23 is a front view of the cord lock (a seventh example) according to one embodiment of the present invention.
Figure 24:
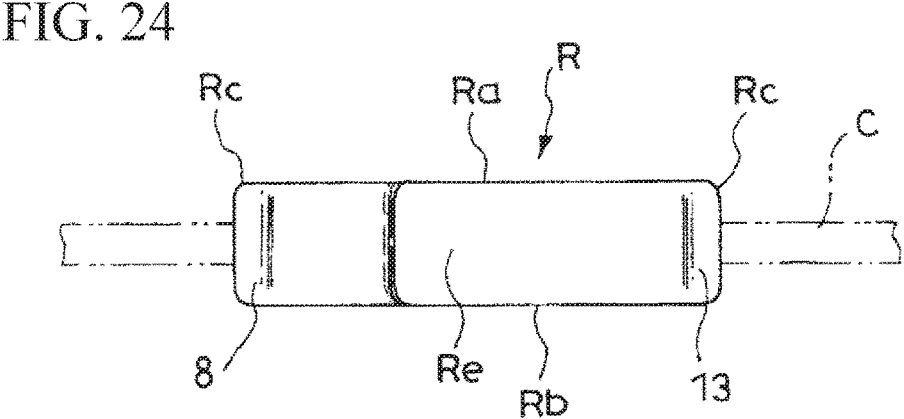
FIG. 24 is a side view of the seventh example.

FIG. 23 and FIG. 24 show a partially modified example (a seventh example) from the structure of the first example. In the seventh example, both of right and left narrow side face portions Re and Re, which become a thickness of the cord lock R, are formed in such a way as to be heightened as coming close to the terminals Rc sides of the cord lock R from the center side of the cord lock R in the length direction of the string C, and have the shape on which a fingertip can be fitted between the two terminals Rc and Rc in the side face portions Re. In the seventh example, one of the two terminals Rc and Rc is formed in the female member 1, and the other of the two terminals Rc and Rc is formed in the male member 2. Thereby, the finger-hooking portions 8 and 13 are respectively formed in the female member 1 and the male member 2.

Eighth Example

Figure 25:
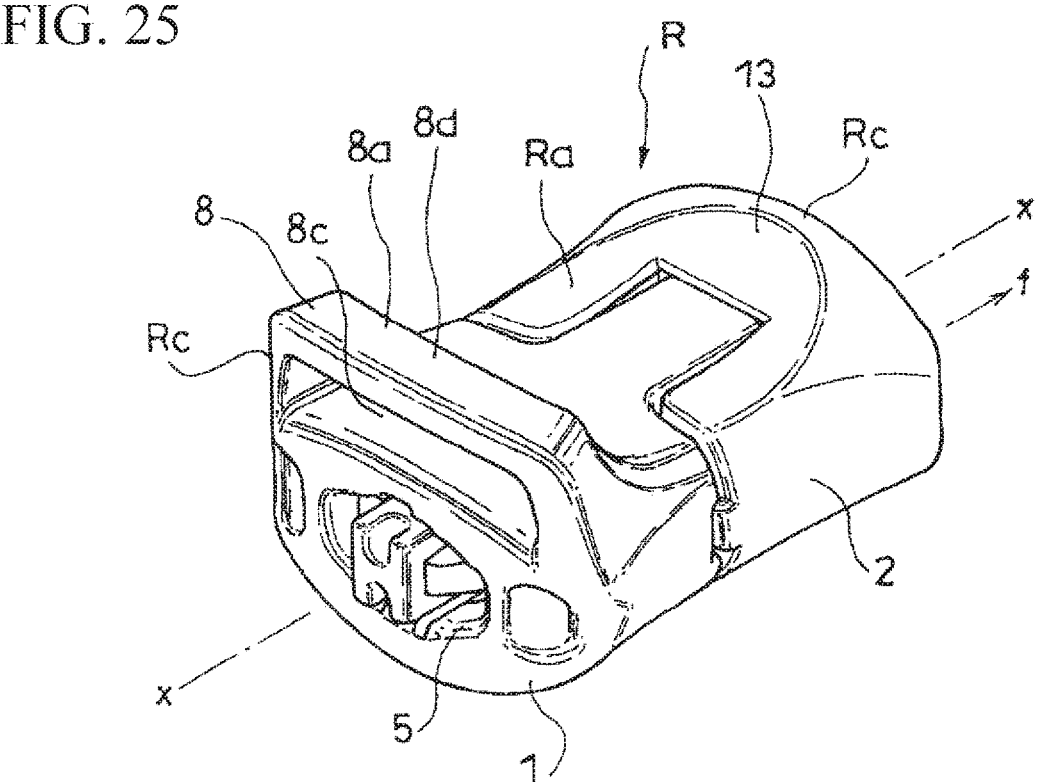
FIG. 25 is a perspective view of the cord lock (an eighth example) according to one embodiment of the present invention.

FIG. 25 shows a partially modified example (an eighth example) from the structure of the first example. In the eighth example, in the finger-hooking portion 8 formed in the front face portion Ra of the female member 1, there is formed a passage 8c having a belt-shaped member in the direction along the moving center axis x, and there is formed a wrapping portion 8d of the belt-shaped member between the passage 8c and the top portion 8a of the finger-hooking portion 8. In the eighth example, the cord lock R and an equipping object (not shown in the drawing) of the cord lock R can be connected by the belt-shaped member using the wrapping portion 8d. In the illustrated example, the female member 1 and the equipping object are integrated by the belt-shaped member so as to release the fastening to the string C inserted to pass through the cord lock R by an operation of pulling the male member in an f direction in FIG. 25. Such wrapping portion 8d may be formed in the male member 2, and may be formed on both of the female member 1 and the male member 2.

Incidentally, obviously, the present invention is not limited to the embodiments explained hereinabove, and includes all embodiments which can obtain the object of the present invention.

EXPLANATION OF SYMBOLS

1 a female member
2 a male member
4 a first opening
5 a second opening
6 an insertion passage
7 female-side fastening portions
8 a finger-hooking portion
12 male-side fastening portions
13 a finger-hooking portion
C a string Incidentally, all contents of the specification, claims, drawings, and abstract of Japanese Patent Application No. 2016-100733 filed on May 19, 2016 are cited in their entireties herein and are incorporated as a disclosure of the specification of the present invention.

What is claimed is:

1. A cord lock, comprising:
a female member including a first opening, a second opening, an insertion passage for a string ranging therebetween, a female-side fastening portion formed inside the insertion passage, and a leg member;
a male member including one portion entered into the insertion passage from a side of the first opening, and at the one portion thereof, a male-side fastening portion adapted to fasten the string inserted to pass through the insertion passage in cooperation with the female-side fastening portion: and
a spring member including one end portion attached to the leg member of the female member and another end portion attached to the one portion of the male member to be interposed between the female member and the male member, and urging the female member and the male member to pull each other,
wherein the female member or the male member is pulled to reduce an entering amount of the one portion of the male member into the insertion passage with gripping the string pulled out from the first opening side or the second opening side to be adapted to release the string fastened with the female member and the male member, and
finger-hooking portions for pulling the female member and the male member are formed in the female member and the male member.

2. A cord lock according to claim 1, wherein the finger-hooking portions are formed in a direction crossing a length direction of the string.

3. A cord lock according to claim 1, further comprising a wide front face portion and a back face portion,
wherein in at least one of the front face portion and the back face portion, the finger-hooking portions are formed respectively in the female member and the male member.

4. A cord lock according to claim 1, further comprising a wide front face portion and a back face portion,
wherein at least one of the front face portion and the back face portion is formed in such a way as to be heightened as coming close to terminal sides of the cord lock from a center side of the cord lock in a length direction of the string, and has a shape on which a fingertip is adapted to be fitted between two terminals.

5. A cord lock according to claim 4, wherein an outer face of the cord lock located between the two terminals becomes a face substantially following an arc of one virtual circle.

6. A cord lock according to claim 1, wherein a center axis of the insertion passage is positioned on one virtual flat surface.

7. A cord lock according to claim 1, wherein one of the male-side fastening portion and the female-side fastening portion is a face portion, another of the male-side fastening portion and the female-side fastening portion is a claw portion projecting toward the face portion, and an angle between at least a side portion of the claw portion facing the first opening side and the face portion becomes a substantially right angle.

8. A cord lock according to claim 7, wherein the claw portion includes a plurality of claws provided at an interval therebetween.

9. A cord lock according to claim 1, wherein at least one of the finger-hooking portion of the female member and the finger-hooking portion of the male member includes a wrapping portion in a belt-shaped member.

10. A cord lock according to claim 1, wherein
the female member includes:
a female-side main member portion having the first opening, the second opening, the insertion passage, and the female-side fastening portion, and
the leg member having two female-side leg portions apart from each other and protruding from the female-side main member portion toward the male member, and a spring holding member arranged between the two female-side leg portions; and the male member includes:
- a male-side main member,
- a male-side leg portion formed as the one portion of the male member and including the male-side fastening portion at one end portion thereof, the male-side leg portion protruding from the male-side main member toward the female member to form a space between the male-side main member and the male-side leg portion, the spring holding member being housed in the space and the spring member being interposed between another end portion of the male-side leg portion opposite to the male-side fastening portion and the spring holding member.

11. A cord lock according to claim 10, wherein the female-side fastening portion is arranged to be inclined inside the insertion passage to reduce an inner diameter of the female-side main member portion from the first opening toward the second opening,
- the male-side fastening portion is arranged at one end of the male-side leg portion to face the female-side fastening portion inside insertion passage, and the string is adapted to be fastened between the male-side fastening portion and the female-side fastening portion.

12. A cord lock according to claim 11, wherein the female member is arranged to be urged toward the male member with the spring when the female member is pulled to be adapted to release the string fastened with the female member and the male member, and
- the male member is arranged to be urged toward the female member with the spring when the male member is pulled to be adapted to release the string fastened with the female member and the male member.

* * * * *